United States Patent
Rawlings et al.

(10) Patent No.: US 7,807,229 B2
(45) Date of Patent: Oct. 5, 2010

(54) METHOD FOR FORMING A PRESSURE SENSITIVE ADHESIVE

(75) Inventors: Diane C. Rawlings, Bellevue, WA (US); Larry K. Olli, Seattle, WA (US); Bruce K. Keough, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/432,624

(22) Filed: Apr. 29, 2009

(65) Prior Publication Data

US 2009/0214793 A1    Aug. 27, 2009

Related U.S. Application Data

(62) Division of application No. 11/228,370, filed on Sep. 17, 2005, now Pat. No. 7,544,407.

(51) Int. Cl.
*B32B 9/00* (2006.01)
*B05D 3/02* (2006.01)
*C08L 75/00* (2006.01)

(52) U.S. Cl. ............... 427/385.5; 427/407.1; 428/40.1; 428/355 R; 524/507; 524/589; 524/612

(58) Field of Classification Search ............... 428/40.1, 428/41.5, 41.8, 355 R, 355 AC, 355 N; 524/507, 524/612, 589; 427/385.5, 407.1
See application file for complete search history.

(56) References Cited

U.S. PATENT DOCUMENTS

| 3,532,652 | A | * | 10/1970 | Zang et al. | ............ 428/355 AC |
| 6,218,006 | B1 | * | 4/2001 | Tokunaga et al. | ..... 428/355 AC |
| 6,706,355 | B2 | * | 3/2004 | Holguin et al. | ............ 428/40.1 |
| 2005/0142318 | A1 | * | 6/2005 | Nakabayashi et al. | ...... 428/40.1 |
| 2005/0175833 | A1 | * | 8/2005 | Yoneda | ................... 428/355 R |

* cited by examiner

*Primary Examiner*—David Wu
*Assistant Examiner*—Marie Reddick
(74) *Attorney, Agent, or Firm*—Toler Law Group

(57) ABSTRACT

Methods of forming a pressure sensitive adhesive (PSA) are provided. The methods may be suitable for aircraft exterior applications. A particular method includes mixing together an un-crosslinked acrylic adhesive, a solvent, and a polyisocyanate crosslinker to form a mixture. The method also includes driving off a portion of the solvent. The method further includes reacting the polyisocyanate crosslinker with the un-crosslinked acrylic adhesive. A resultant crosslinked adhesive exhibits a peel strength in a range between around 2 pounds per square inch and around 8 pounds per square inch at temperatures in a range between around 180 degrees Fahrenheit and around 250 degrees Fahrenheit.

12 Claims, 2 Drawing Sheets

METHOD FOR FORMING A PRESSURE SENSITIVE ADHESIVE

CLAIM OF PRIORITY

The present application claims priority from and is a divisional of patent application Ser. No. 11/228,370 now U.S. Pat. No. 7,544,407 filed on Sep. 17, 2005 and entitled "PRESSURE SENSITIVE ADHESIVE SUITABLE FOR AIRCRAFT EXTERIOR APPLICATIONS," the contents of which are expressly incorporated herein by reference in their entirety.

BACKGROUND

Replacing paint on aircraft exterior surfaces with appliqués may be desirable for a variety of reasons, including weight reduction, elimination of hazardous materials associated with painting and paint stripping, maintenance cost savings, and lightning strike protection. Appliqués also allow incorporation of drag-reducing riblets and hydrophobia/anti-ice materials and textures.

Appliqués typically include three components: (i) a protective barrier film; (ii) a pressure sensitive adhesive (PSA); and (iii) a release liner. Typical material specifications for appliqués used on aircraft include: a temperature range from around −65 degrees Fahrenheit up to around 230 degrees Fahrenheit; fluid resistance to a wide range of substances such as jet fuel, hydraulic fluid, aircraft wash fluids, de-icing fluids, lube oil, and the like; exposure to environmental conditions such as ultraviolet (UV) radiation, hot condensing humidity, salt spray, rain erosion, wind erosion, and the like; and easy removal and repair.

The PSA plays an important role in an appliqués ability to withstand such conditions. In addition, and unlike paint systems, ability to maintain bond of an appliqué to an aircraft skin may affect flight safety considerations. For example, it must be demonstrated that an appliqué will not peel in flight as a large section or "gore"—even if peeling initiates due to impact or other damage.

Current PSAs used for aircraft exterior applications generally are acrylic polymer-based adhesives, and can have good moisture resistance and relatively high bond strengths. While some current PSAs are resistant to some aircraft fluids, few PSAs are currently available that can resist all aircraft fluids, can withstand extended exposure to high humidity, and can maintain adhesion over a wide range of temperatures. For example, many acrylic PSAs tend to lose peel adhesion to the protective barrier film at temperatures above 150 degrees Fahrenheit.

A current PSA available from the 3M Company maintains adhesion values over a temperature range of −65 degrees Fahrenheit to 230 degrees Fahrenheit or higher while resisting aircraft fluids such as jet fuel. However, this PSA is unavailable as a transfer film adhesive (which is the form used in several current appliqués). Moreover, cost of this PSA precludes its use as a commercially-viable PSA for commercial aircraft use.

Currently known PSAs with acceptable resistance to aircraft fluids typically lose the bond interface to the protective barrier film as the PSA and the barrier film go through their glass transition temperatures. In such a case, in the event of a fracture at the interface, the PSA will remain adhered to the underlying substrate but the barrier film will peel off the PSA. In addition, the PSAs fail cohesively on peeling at a low peel strength at high temperatures, such as temperatures greater than 200 degrees Fahrenheit.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with products and methods which are meant to be exemplary and illustrative, not limiting in scope. In various embodiments, one or more of the problems described above in the Background have been reduced or eliminated, while other embodiments are directed to other improvements.

Embodiments provide a pressure sensitive adhesive (PSA) suitable for aircraft exterior applications. By reacting a crosslinker with an un-crosslinked adhesive, a resultant PSA can resist many aircraft fluids and can maintain a bond to a protective barrier film of an appliqué at low and high temperatures.

An exemplary pressure sensitive adhesive includes a release liner and a crosslinked adhesive releasably bonded to the release liner. The crosslinked adhesive suitably is formed by reacting a polyisocyanate crosslinker with an un-crosslinked acrylic adhesive. In one embodiment, the crosslinker is an aliphatic polyisocyanate crosslinker. However, the crosslinker need not be aliphatic.

According to an aspect, the pressure sensitive adhesive can exhibit improved high-temperature peel strength over current PSAs. For example, the pressure sensitive adhesive can exhibit a peel strength between a minimum peel strength of around 2 pounds per square inch (psi) and a maximum peel strength of around 8 psi at temperatures between around 180 degrees Fahrenheit and around 250 degrees Fahrenheit.

According to another embodiment, an exemplary method provides a pressure sensitive adhesive. An un-crosslinked acrylic adhesive, a solvent, and a polyisocyanate crosslinker are mixed together. The mixture is reacted on a release liner. A portion of the solvent is driven off, and the polyisocyanate crosslinker is reacted with itself and with reactive groups remaining on the un-crosslinked acrylic adhesive.

In addition to the exemplary embodiments and aspects described above, further embodiments and aspects will become apparent by reference to the drawings and to the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
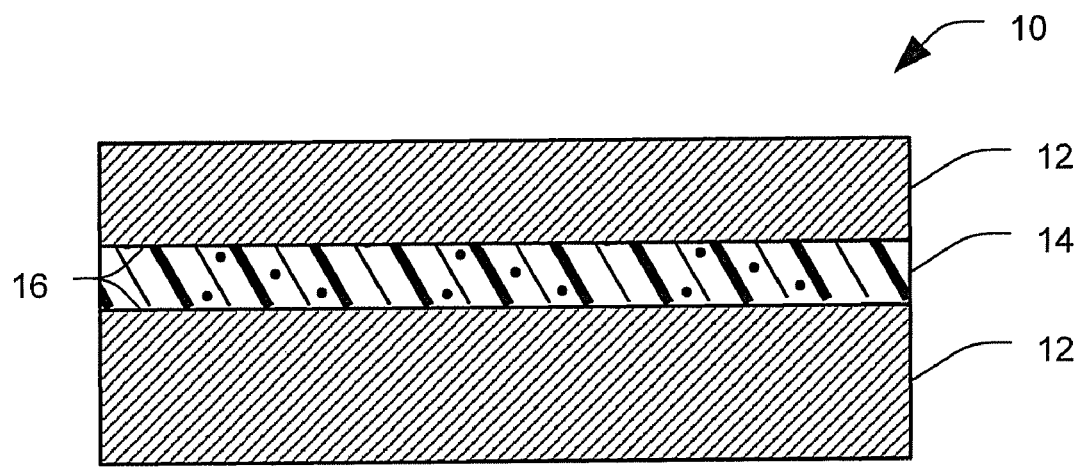
FIG. 1 is a side view of an exemplary pressure sensitive adhesive.

Referring to FIG. 1 and by way of overview, an exemplary pressure sensitive adhesive (PSA) 10 that is suitable for aircraft exterior applications is illustrated. By reacting a crosslinker with an un-crosslinked adhesive, the resultant PSA 10 can resist many aircraft fluids and can maintain a bond to a protective barrier film (not shown in FIG. 1) of an appliqué (not shown in FIG. 1) at low and high temperatures. Given by way of non-limiting example, the exemplary PSA 10 includes release liners 12 and a crosslinked adhesive 14 releasably bonded to the release liners 12. The crosslinked adhesive 14 suitably is formed by reacting a polyisocyanate crosslinker, such as, without limitation, an aliphatic polyisocyanate crosslinker, with an un-crosslinked acrylic adhesive. Advantageously and as a result, the PSA 10 can exhibit improved high-temperature peel strength over current PSAs. Details of the PSA 10 and a method of making the PSA 10 will now be set forth below.

The PSA 10 includes the release liners 12. While two of the release liners 12 are shown, in one embodiment only one release liner 12 is provided (and the resultant PSA 10 is self-wound) if that liner and the release are stable at the processing temperatures (discussed below) for the PSA. In another embodiment, the adhesive could be cast directly onto the appliqué film (thereby entailing use of no release liners) if the appliqué film is heat stable enough. In one embodiment, two of the release liners 12 are provided such that one release liner 12 stays on when the other release liner 12 is peeled off. The release liners 12 are releasably bonded at a surface 16 of the crosslinked adhesive 14 such that the release liners 12 can be cleanly removed from the crosslinked adhesive 14 without tearing or otherwise damaging the release liners 12 or the crosslinked adhesive 14. The release liners 12 suitably each are pieces of film, such as without limitation polyester, polyethylene, or coated paper. The film may be provided as a roll product. The release liners 12 are each coated at the surface 16 with a thin coating of a non-stick substance, such as, without limitation, silicone, polyethylene, or fluorochemicals. Thickness of the release liners 12 suitably is in a range between around 1-6 mils depending on the composition and stiffness of the release liners 12. For example, polyester liners are often around 1-2 mils thick and paper liners may be between around 3-6 mils thick. The release liners 12 may have a uniform thickness so that the PSA 10 can be uniform in thickness. The release liners 12 are selected such that they are able to withstand the processing temperatures, discussed below, of the PSA 10. Alternately and at higher cost, the PSA 10 may be processed on one liner and then switched to another liner. An important feature of the release liners 12 is differential release. Regardless of whether the PSA 10 is coated on one release liner 12 or two release liners 12, the tight release is significantly weaker than the PSA 10 or film product itself so that the release liner 12 will peel off when it is desired to use an appliqué without creating shock lines or other distortion of the PSA 10. It is also helpful to have some stiffness in the release liner 12 so that it peels uniformly without kinking.

The crosslinked adhesive 14 suitably is formed by reacting a polyisocyanate crosslinker, such as, without limitation, an aliphatic polyisocyanate crosslinker, with an un-crosslinked acrylic adhesive. The un-crosslinked acrylic adhesive preferably exhibits resistance to several aircraft solvents, jet fuel, lube oil, water, and the like. At high temperatures (on the order of around 180-200 degrees Fahrenheit), the un-crosslinked acrylic adhesive also preferably exhibits a minimum peel strength of around 2 pounds per square inch (psi) and a maximum peel strength of around 8 psi. The un-crosslinked acrylic adhesive suitably is any of a number of commercially-available acrylic adhesives. Given by way of non-limiting example, a suitable un-crosslinked acrylic adhesive includes Gelva Multipolymer Solution™ (GMS) 3051, available from Cytec Surface Specialties. The following explanation will be noted regarding use herein of the terminology "un-crosslinked adhesive". It is initially noted that polymers that include PSAs could be considered as "crosslinked" because that is how PSA polymers are formed. However, embodiments set forth herein provide additional crosslinking between the isocyanate (that is, the polyisocyanate crosslinker) and the PSA polymer (that is, the "un-crosslinked acrylic adhesive") and also to the isocyanate itself (isocyanates will crosslink with themselves in the presence of water).

The crosslinker suitably is an aliphatic isocyanate (hexamethylene diisocyanate (HDI) trimer). The crosslinker is used as a hardener for the un-crosslinked acrylic adhesive. The aliphatic isocyanate crosslinker has three functional isocyanate (—N=C=O) groups on a ring structure of medium-short carbon chains. A suitable aliphatic isocyanate crosslinker is Desmodur® N3300 available from Bayer AG. The aliphatic isocyanate crosslinker suitably has an NCO content of around 21.8±0.3 percent; a viscosity at 23 degrees Centigrade of around 3,000±750 mPa·s; and monomeric HDI of less than around 0.15 percent. The aliphatic isocyanate crosslinker may be supplied in solvent-free form. The crosslinker need not be an aliphatic isocyanate crosslinker, and other crosslinkers may be used as desired for a particular application. For example, the crosslinker may be an aromatic isocyanate or an epoxy. As a further example, the crosslinker may be a blocked isocyanate that unblocks at temperatures used for processing the adhesive, such as Bayer b13175.

As a result of reacting the aliphatic isocyanate crosslinker with the un crosslinked acrylic adhesive, the resultant crosslinked adhesive 14 has an increased crosslink density compared to the un-crosslinked acrylic adhesive. Advantageously, this increased crosslink density of the crosslinked adhesive 14 makes the PSA 10 well-suited for use in an appliqué for an aircraft exterior. This is because the increased crosslink density results in increased high-temperature cohesive strength and peel strength of the crosslinked adhesive 14 compared to the un-crosslinked acrylic adhesive.

Figure 2:
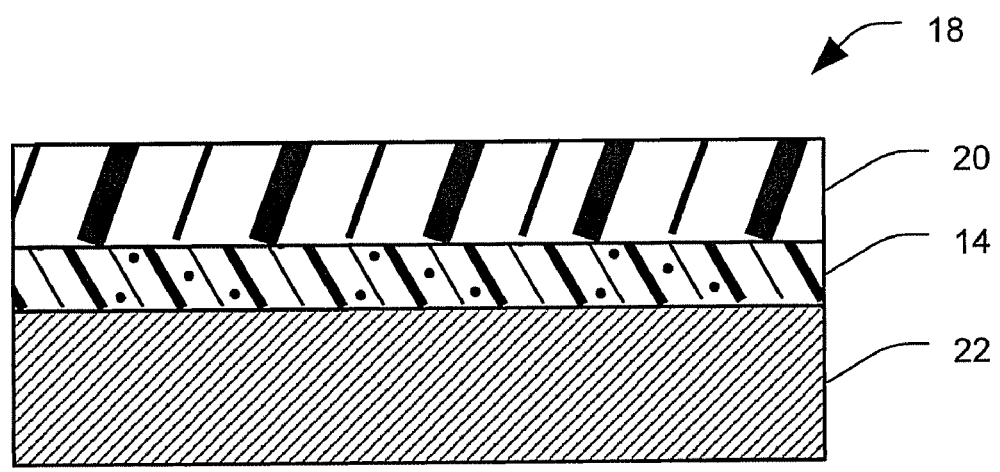
FIG. 2 is a side view of the pressure sensitive adhesive of FIG. 1 incorporated in an appliqué that is applied to a substrate.

Referring additionally to FIG. 2, the crosslinked adhesive 14 provided with the PSA 10 is used in an exemplary appliqué 18. The appliqué 18 suitably is any appliqué that is used as a paint replacement system. For example, the appliqué 18 may be a transfer film appliqué used as a paint replacement system for aircraft. An exemplary appliqué in which the crosslinked adhesive 14 may be used is described in U.S. patent application Ser. No. 10/941,429 for "Appliqué" by Diane C. Rawlings and Bruce K. Keough and assigned to The Boeing Company, the entire contents of which are incorporated by reference. In general terms, the appliqué 18 includes a barrier film 20, such as, without limitation, a polymer film. If two release liners 12 (FIG. 1) are provided, then one of the release liners 12 is removed from the crosslinked adhesive 14. The barrier film 20 is disposed on the crosslinked adhesive 14. The remaining release liner 12 (FIG. 1) is removed from the crosslinked adhesive 14, and the crosslinked adhesive 14 is bonded to a substrate 22, such as, without limitation, a skin of an aircraft.

While the appliqué 18 may be used as a paint replacement system on any surface as desired, the appliqué 18 (that is, any appliqué that uses the crosslinked. adhesive 14) is especially well-suited for use on an aircraft skin. This is because the crosslinked adhesive 14 has a minimum peel strength with the barrier film 20 of around 2 psi and a maximum peel strength of around 8 psi at higher temperatures—from around 180 degrees Fahrenheit up to around 250 degrees Fahrenheit—than temperatures that are achievable with current PSAs.

Figure 3:
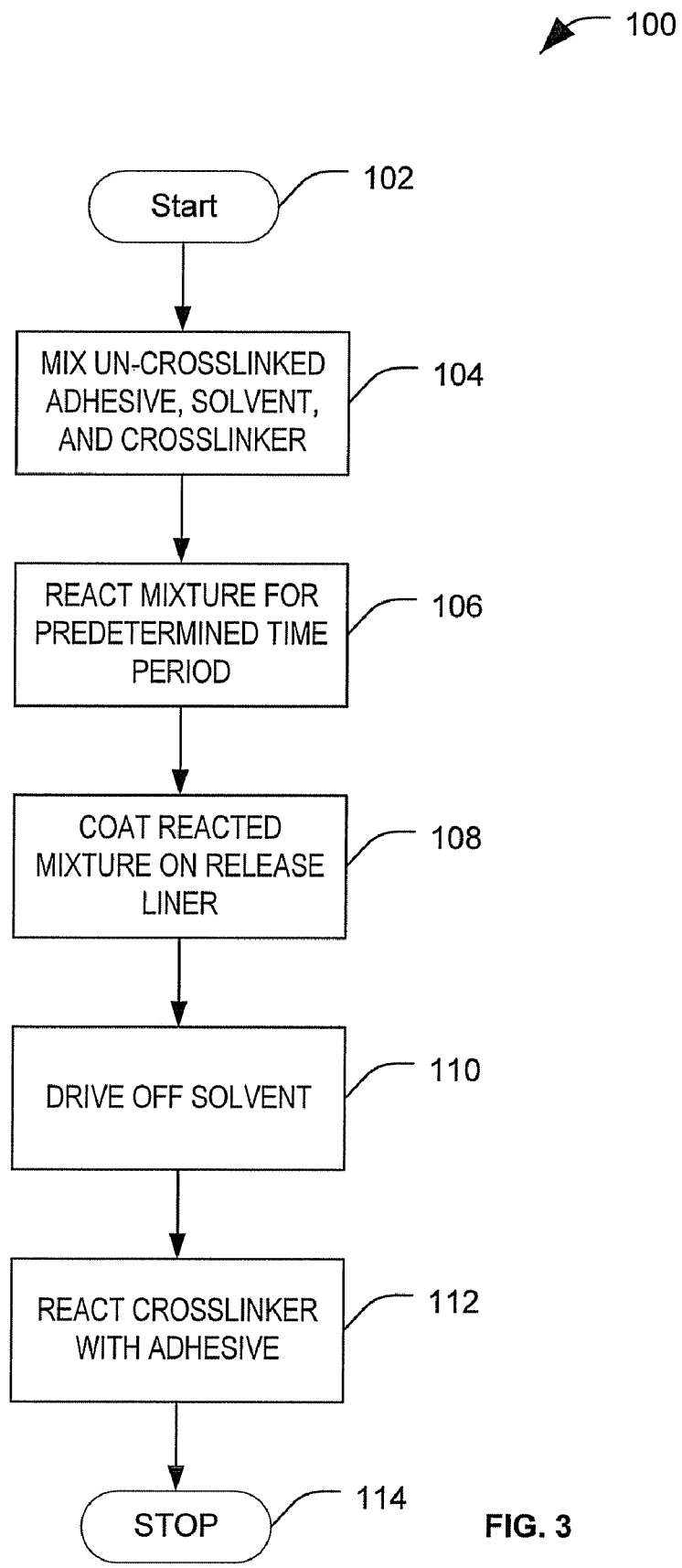
FIG. 3 is a flowchart of an exemplary method of providing a pressure sensitive adhesive.

An exemplary method of providing the PSA 10 will now be described. Referring now to FIGS. 1 and 3, a method 100 begins at a block 102. At a block 104, the un-crosslinked acrylic adhesive, a solvent, and the aliphatic isocyanate crosslinker are mixed. The solvent reduces the viscosity of the aliphatic isocyanate crosslinker so that the mixture does not cure into a substance that can not be poured. The un-crosslinked acrylic adhesive and the aliphatic isocyanate crosslinker have been described above. The solvent suitably is any solvent that is compatible with the un-crosslinked acrylic adhesive and the aliphatic isocyanate crosslinker. Given by way of nonlimiting example, suitable solvents include esters, ketones and aromatic hydrocarbons such as ethyl acetate, butyl acetate, methoxypropylacetate, acetone, methyl ethyl ketone, methyl isobutyl ketone, cyclohexanone, toluene, xylene, solvent naphtha 100, and mixtures thereof. In one embodiment, ethyl acetate is used as the solvent.

The mixture includes around 92 percent to around 99 percent by weight of the un-crosslinked acrylic adhesive, around 0 percent to around 2 percent by weight of the solvent, and around 1 percent to around 6 percent by weight of the aliphatic polyisocyanate crosslinker. In one embodiment, the mixture includes around 96.74 percent by weight of the un-crosslinked acrylic adhesive, around 1.63 percent by weight of the solvent, and around 1.63 percent by weight of the aliphatic polyisocyanate crosslinker. The mixture is mixed for around 20 minutes or so. The viscosity of the mixture increases during mixing such that the mixture gels within around 20 minutes or so of mixing.

At a block 106 the mixture is reacted. The time period that the mixture is reacted suitably is around 24 hours or so. At the end of the reaction time period, the mixture can be poured. While the mixture reacts, the viscosity increases from the viscosity of the mixture at the end of mixing at the block 104. During the reaction, the viscosity of the mixture increases to a maximum value such that the mixture is gelatinous and can not be poured. As the reaction continues past this point, the viscosity of the mixture decreases. By the end of the reaction time period, the viscosity of the mixture has decreased to a viscosity that is less than the maximum viscosity exhibited during the reaction but greater than the viscosity at the beginning of the reaction at the block 106. At the end of the reaction time period, the viscosity of the mixture is such that the mixture can be poured and coated using conventional coating equipment.

At a block 108, the surface 16 of one of the release liners 12 is coated with a non-stick substance such as silicone, and the reacted mixture is coated thereon. If two release liners 12 are provided, then the surface 16 of the other release liner 12 is coated with the non-stick substance and is placed on top of the reacted mixture. The non-stick substance is applied to the surface 16 to make the release liner(s) 12 and the crosslinked adhesive 14 releasably (as opposed to permanently) bonded to each other.

At a block 110, a portion of the solvent is driven off. The reacted mixture is heated at desired times at desired temperatures until the remaining solvent is less than around 1 percent by weight. As will be understood by the description that follows, the block 110 and a subsequent processing block may be performed in a multiple zone oven. As will also be understood from an explanation of subsequent processing, it may be desirable to reduce line speed of the multiple zone oven to speeds that are slower than line speeds that may typically be encountered in commercial off-the-shelf ovens. The release liner(s) 12 (suitably in roll form) with the reacted mixture coated thereon are fed into a first stage of an oven that has a temperature suitably between around 120-130 degrees Fahrenheit and preferably around 125 degrees Fahrenheit for a time period between around 2-3 minutes. This time-at-temperature combination is based on a typical oven stage of around 25 feet or so in length with a line speed of around 10 feet per minute or so. Again, it will be understood that this line speed may be lower than typical line speeds of current commercial off-the-shelf ovens.

In one embodiment, driving off the solvent at the block 110 continues. The reacted mixture enters a second stage of an oven that has a temperature suitably between around 150-200 degrees Fahrenheit and preferably around 200 degrees Fahrenheit for a time period between around 2-3 minutes. This time-at-temperature combination is based on a typical oven stage of around 25 feet or so in length with a line speed of around 10 feet per minute or so. At the end of heating in the second stage of the oven, the remaining solvent has been reduced to less than around 1 percent by weight. However, any time-at-temperature combination may be effected to drive off the solvent as desired for a particular application. For example, a higher line speed may be used in a commercial off-the-shelf oven in combination with a higher oven temperature in order to drive off the solvent. Further, the solvent may be driven off in fewer than two stages or more than two stages as desired for a particular application and as determined by constraints, such as line speed, of available ovens.

At a block 112 the crosslinker is reacted with the un-crosslinked acrylic adhesive. The reacted mixture (with the solvent driven off) enters a third stage of an oven that has a temperature suitably between around 320-350 degrees Fahrenheit and preferably around 350 degrees Fahrenheit for a time period between around 2-3 minutes. This time-at-temperature combination is based on a typical oven stage of around 25 feet or so in length with a line speed of around 10 feet per minute or so. In general, the longer the time-at-temperature and the higher the temperature, the more the increase in crosslink density and the more solvent driven off.

It may be possible to use higher temperatures at higher line speeds, depending on material properties of the release liner(s) 12. Time-at-temperature variations may be determined according to reaction rate relationships to temperature (that is in general, reaction rate doubles for every temperature increase of 10 degrees Centigrade). For example, if desired, the block 112 could be performed in an oven stage with a line speed of around 40 feet per minute at around 390 degrees Fahrenheit for a time of around 2-3 minutes. As another example, the block 112 could be performed in an oven stage with a line speed of around 50 feet per minute (industry typical line speed) at around 400 degrees Fahrenheit for a time of around 2-3 minutes. However, some release liners, such as those made of polyester, may tend to distort at temperatures greater than 350 degrees Fahrenheit.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true scope.

What is claimed is:

1. A method, comprising:
mixing together an un-crosslinked acrylic adhesive, a solvent, and a polyisocyanate crosslinker to form a mixture, wherein the mixture has a first viscosity after mixing;
partially reacting the mixture for a first time period, wherein the mixture has a second viscosity that is greater than the first viscosity after the first time period;
partially reacting the mixture for a second time period, wherein the mixture has a third viscosity that is greater than the first viscosity and that is less than the second viscosity after the second time period;

applying the mixture as a coating to a release liner after the second time period;

driving off a portion of the solvent; and further reacting the polyisocyanate crosslinker with the un-crosslinked acrylic adhesive, wherein a resultant crosslinked adhesive exhibits a peel strength in a range between about 2 pounds per square inch and about 8 pounds per square inch at temperatures in a range between about 180 degrees Fahrenheit and about 250 degrees Fahrenheit.

2. The method of claim 1, wherein the mixture includes about 92 percent to about 99 percent by weight of the un-crosslinked acrylic adhesive, about 0 percent to about 2 percent by weight of the solvent, and about 1 percent to about 6 percent by weight of the polyisocyanate crosslinker.

3. The method of claim 1, further comprising coating the release liner with silicone before applying the mixture as the coating to the release liner.

4. The method of claim 1, further comprising covering the coating with a second release liner.

5. The method of claim 4, further comprising coating the second release liner with silicone before covering the coating with the second release liner.

6. The method of claim 1, wherein driving off the portion of the solvent includes heating the mixture for a third predetermined time period at a first predetermined temperature.

7. The method of claim 6, wherein driving off the portion of the solvent further includes heating the mixture for a fourth predetermined time period at a second predetermined temperature.

8. The method of claim 7, wherein the second predetermined temperature is in a range between about 150 degrees Fahrenheit and about 200 degrees Fahrenheit, and the fourth predetermined time period is in a range between about 2 minutes and about 3 minutes.

9. The method of claim 6, wherein the first predetermined temperature is in a range between about 120 degrees Fahrenheit and about 130 degrees Fahrenheit and the third predetermined time period is in a range between about 2 minutes and about 3 minutes.

10. The method of claim 1, wherein after driving off the portion of the solvent the mixture includes less than about 1 percent by weight of the solvent.

11. The method of claim 1, wherein the polyisocyanate crosslinker includes an aliphatic polyisocyanate crosslinker.

12. The method of claim 1, wherein the polyisocyanate crosslinker comprises a blocked isocyanate.

* * * * *